United States Patent [19]

Furukawa et al.

[11] Patent Number: 4,952,335
[45] Date of Patent: * Aug. 28, 1990

[54] FERROELECTRIC CHIRAL SMECTIC LIQUID CRYSTAL COMPOSITION

[75] Inventors: Kenji Furukawa; Kanetsugu Terashima; Mitsuyoshi Ichihashi; Makoto Kikuchi, all of Yokohamashi, Japan

[73] Assignee: Chisso Corporation, Osaka, Japan

[*] Notice: The portion of the term of this patent subsequent to Jan. 3, 2006 has been disclaimed.

[21] Appl. No.: 230,041

[22] Filed: Aug. 9, 1988

Related U.S. Application Data

[63] Continuation of Ser. No. 871,981, Jun. 9, 1986, abandoned.

[30] Foreign Application Priority Data

Jun. 18, 1985 [JP] Japan ................................ 60-132817

[51] Int. Cl.$^5$ ...................... C09K 19/34; C09K 19/52; C09K 19/30; C09K 19/20
[52] U.S. Cl. ........................... 252/299.61; 252/299.01; 252/299.6; 252/299.63; 252/299.64; 252/299.65; 252/299.66; 252/299.67; 252/299.68; 350/350 S
[58] Field of Search ............... 350/350 S; 252/299.01, 252/299.61, 299.63, 299.64, 299.65, 299.67, 299.68, 289.6, 299.66

[56] References Cited

U.S. PATENT DOCUMENTS

| | | | |
|---|---|---|---|
| 4,614,609 | 9/1986 | Inoue et al. | 252/299.66 |
| 4,615,586 | 10/1986 | Geary et al. | 350/350 S |
| 4,622,165 | 11/1986 | Kano et al. | 252/299.65 |
| 4,684,220 | 8/1987 | Shionozaki et al. | 252/299.61 |
| 4,714,323 | 12/1987 | Katagiri et al. | 350/350 S |
| 4,721,367 | 1/1988 | Yoshinaga et al. | 350/350 S |
| 4,780,241 | 10/1988 | Furukawa et al. | 252/299.63 |
| 4,784,792 | 11/1988 | Inoue et al. | 252/299.61 |
| 4,795,587 | 1/1989 | Ohno et al. | 252/299.61 |
| 4,820,839 | 4/1989 | Krause et al. | 252/299.61 |
| 4,834,904 | 5/1989 | Krause et al. | 252/299.61 |

FOREIGN PATENT DOCUMENTS

| | | | |
|---|---|---|---|
| 136725 | 4/1985 | European Pat. Off. | 252/299.66 |
| 156726 | 10/1985 | European Pat. Off. | 252/299.64 |
| 3525015 | 1/1986 | Fed. Rep. of Germany | 252/299.66 |
| 3515374 | 11/1986 | Fed. Rep. of Germany | 252/299.61 |
| 87/209190 | 9/1987 | Japan | 252/299.61 |
| 86/02937 | 5/1986 | PCT Int'l Appl. | 252/299.66 |

OTHER PUBLICATIONS

Goodby et al., Journal de Physique, vol. 40, pp. (3–27 (1979).
Matsumura et al., Mol. Cryst. Liq. Cryst., vol. 49 (Letters), pp. 105–112 (1978).
Levstik et al., CA 101:181678z (1984).
Demus (ed.), Flussige Kristalle in Tabellen I, pp. 260–277 (1974).
Demus (ed.), Flussige Kristalle in Tbellen II, pp. 363–365, 375–379 (1984).

Primary Examiner—John S. Maples
Assistant Examiner—Philip Tucker
Attorney, Agent, or Firm—Fred Philpitt

[57] ABSTRACT

A ferroelectric chiral smectic liquid crystal composition affording a high response speed and being cheap so that a high speed switching can be effected, which composition comprises at least one achiral smectic C compound and at least one chiral smectic C compound, characterized in that at least one of said at least one achiral smectic C compound contains at least two divalent six-memberd ring, directly linked by at least one single bond, at least one of said at least two divalent six-membered rings being selected from pyrimidin-2,5-diyl, pyridin-2,5-diyl, 1,4-phenylene or trans-1,4-cyclohexylene.

6 Claims, 1 Drawing Sheet

FERROELECTRIC CHIRAL SMECTIC LIQUID CRYSTAL COMPOSITION

This is a continuation of application Ser. No. 871,981, filed Jun. 9, 1986, now abandoned and the benefits of 35 USC 120 are claimed relative to it.

BACKGROUND OF THE INVENTION

1. Field of the Invention

This invention relates to a chiral smectic liquid crystal composition. More particularly it relates to a ferroelectric liquid crystal composition having a long helical pitch and superior response properties, obtained by adding a ferroelectric chiral smectic liquid crystal to at least one kind of liquid crystal compounds of a directly linked ring type structure having a smectic C phase (hereinafter abbreviated to $S_c$ phase).

2. Description of the Prior Art

Liquid crystal compounds have been widely used as a material for display elements, but most of such liquid crystal display elements are of TN type display mode and as the liquid crystal materials, those belonging to a nematic phase have been used.

Since the TN type display mode is of non-emissive type, it has specific features that eyes are not tired and the electric power consumption is very small, whereas it has drawbacks that response is slow and the display is not seen in certain angles of view. Recently, the display mode has come to be turned toward a direction of making use of the specific feature in the form of a flat display. In particular, high speed response properties and a broad angle of view have been required. Thus, in order to satisfy such a requirement, improvement in liquid crystal materials has been attempted. However, as compared with other emissive type displays such as electroluminescence display, plasma display, etc., the TN display mode has been confirmed to be considerably inferior in the responce time and the broadness of the angle of view to the above emissive type displays. Making use of the specific features of the non-emissive type and the low power consumption of the liquid crystal display elements, and yet in order to ensure the response properties corresponding to those of the emissive type display elements, it has been indispensable to develop a new liquid crystal display mode. As one of such attempts, a display mode utilizing the light switching phenomenon of ferroelectric liquid crystals has been proposed by N. A. Clark and S. T. Lagerwall (see Applied Physics Letters, Vol. 36, page 899 (1980)). Ferroelectric liquid crystals have been announced by R. B. Mayer for the first time (see Journal de Physique Vol. 36, page 69 (1975)), and in the aspect of crystal structure, the crystals belong to chiral smectic C phase, chiral smectic I phase, chiral smectic F phase, chiral smectic G phase and chiral smectic H phase (hereinafter abbreviated to $S_c^*$ phase, $S_I^*$ phase, $S_F^*$ phase, $S_G^*$ phase and $S_H^*$ phase, respectively).

When the light switching effect of $S_c^*$ phase is applied to display elements, there are two superior specific features as compared with TN display mode. The first specific feature consists in that the response is effected at an extremely high speed and the response time is 1/100 or less that of TN display elements. The second specific feature consists in that there is a memory effect and multiplexing drive is easy in cooperation with the above high speed response properties.

As the display mode, two modes are considered. One mode is of a birefringence type using two polarizers and the other is of guest-host type using a dichroic dyestuff. $S_c^*$ phase has a spontaneous polarization; hence by inverting the polarity of impressed voltage, liquid crystal molecules turn over by $\pi$-rotation around their helical axes as the rotating axes. The liquid crystal display mode using the ferroelectric chiral smectic liquid crystals is a mode utilizing the above reverse phenomenon of liquid crystal molecule. The birefringence type display mode is a mode utilizing a fact that the liquid crystal molecule has a birefringent index and behaves in the same manner as in the case of optically uniaxial crystal. In the case of this mode, by filling a liquid crystal composition having a $S_c^*$ phase in a liquid crystal display cell subjected to an aligining treatment so that the liquid crystal molecules can be aligned in parallel to the surface of the electrodes; placing the liquid crystal cell between two sheets of polarizers arranged so as to form crossed nicols state, so that the director of liquid crystal molecules can be in parallel to the polarization plane of one of the polarizers; and impressing a voltage to invert the polarity, the director of liquid crystal molecules is arranged in the direction of extinction position or diagonal position, whereby it is possible to obtain a dark view or a bright view.

Since liquid crystal molecules are rotated around the helical axis by the polarity reversal through impressed voltage, it is preferred in the case of the birefringence type display mode that the angle of the major axis of liquid crystal molecule made against the helical axis (hereinafter referred to as "tilt angle") be 22.5°.

On the other hand, in the case of the guest-host type, it is possible to obtain an uncolored view or a colored view, depending on the angle of the direction of the transition moment of a dichroic dyestuff dissolved in a liquid crystal compound or a liquid crystal composition, made against the polarization plane of the polarizer. When the direction of the transition moment of the dichroic dyestuff molecule and the direction of the polarization plane are in parallel to each other in the case of one polarity, and the former direction is crossed with the latter direction in the case of the other polarity, then the best contrast is obtained. Namely, when the tilt angle of liquid crystal molecule is 45°, it is possible to obtain the best contrast.

In order that the display element using a ferroelectric chiral smectic liquid crystal can have a memory, it is regarded as necessary to be able to form two stable states (bistable state) on the surface of electrode by polarity inversion of impressed voltage. In order to obtain a liquid crystal display element having the above bistable state and high speed response properties, it is necessary to make the cell gap d less than the helical pitch P (d>P) to untwist the helix, as proposed by N. A. Clark et al (see N. A. Clark et al, Applied Physics Letters, vol. 36, page 899 (1980)).

Further, when the display element using a ferroelectric liquid crystal is brought into the above bistable state, there is generally the following relationship (1) among the threshold voltage Ec required for inverting molecule, the helical pitch P and the value of the spontaneous polarization Ps:

$$Ec = \frac{\pi^4 K}{4P \cdot Ps} \quad (1)$$

(see R. B. Mayer, Molecular Crystal and Liquid Crystal, vol. 40, page 33 (1977)).

In the above formula (1), K represents a torsional elastic constant at the time of deformation due to turning-over of molecule. As apparent from the equation (1), in order to reduce the threshold voltage, a longer helical pitch and a larger spontaneous polarization value are preferred.

Further, there is the following relationship among the response time ($\tau$), the spontaneous polarization value (Ps) and the viscosity ($\eta$):

$$\tau = \frac{\eta}{Ps \cdot E} \quad (2)$$

In the above equation (2), E represents an impressed voltage. Thus, in order to raise the response speed, there are the following methods:

(a) the viscosity $\eta$ is reduced;
(b) the spontaneous polarization value Ps is increased; and
(c) the impressed voltage E is elevated.

Liquid crystal cells are driven by means of LSI (Large Scale Integrated Circuit) which is generally operated under a considerably low voltage. Thus the impressed voltage of liquid crystal cells is preferred to be as low as possible. Accordingly, it is actually necessary to lower the viscosity $\eta$ or raise the spontaneous polarization value Ps.

In general, ferroelectric chiral smectic liquid crystal compounds having a large spontaneous polarization value, have a tendency that their viscosity increases. Thus, even if the spontaneous polarization value is increased uselessly, the viscosity increases accordingly, and as a result, it is considered that the response speed is not raised so much.

As described above, in order to obtain an element having a high response speed by applying the light-switching effect of $S_c^*$ phase, a ferroelectric chiral smectic liquid crystal composition having a low viscosity is required.

SUMMARY OF THE INVENTION

As seen from the foregoing, a first object of the present invention is to provide a ferroelectric chiral smectic liquid crystal composition affording a high response speed and being cheap so that a high speed switching can be effected.

The present inventors have already disclosed an invention of a ferroelectric chiral smectic liquid crystal composition consisting of a compound having a smectic C phase and having no helical structure and a ferroelectric chiral smectic liquid crystal compound having a helical structure (Japanese patent application No. Sho 60-36003/1985). The specification of the above application discloses that when a ferroelectric compound having a small helical pitch but having a large spontaneous polarization value is blended with a liquid crystal compound having a smectic C phase and having no helical structure, it is possible to obtain a liquid crystal composition having a large spontaneous polarization value and a long helical pitch and being cheap.

In order to further improve the above invention, the present inventors have made strenuous research, and as a result have found that there is, as a component, an achiral compound capable of particularly raising the response speed of display elements using a highly ferroelectric chiral smectic liquid crystal composition.

The present invention in a first aspect resides in:

(1) A ferroelectric chiral smectic liquid crystal composition comprising at least one achiral smectic C compound and at least one chiral smectic C compound, characterized in that at least one of said at least one achiral smectic C compound contains at least two divalent six-membered rings, directly linked by at least one single bond, at least one of said at least two divalent six-membered rings being selected from pyrimidin-2,5-diyl, pyridin-2,5-diyl, 1,4-phenylene or trans-1,4-cyclohexylene.

(2) A ferroelectric chiral smectic liquid crystal composition according to the above item (1) wherein said at least one achiral smectic C compound is a compound expressed by the formula

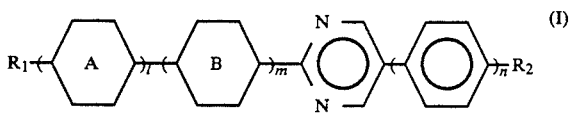

wherein

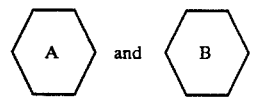

independently represent benzene ring or cyclohexane ring; l, m and n independently represent 0 or 1; and $R_1$ and $R_2$ independently represent an alkyl group, an alkoxy group or an alkanoyloxy group each of 1 to 18 carbon atoms.

(3) A ferroelectric chiral smectic liquid crystal composition according to the above item (1) wherein said at least one achiral smectic C compound is a compound expressed by the formula

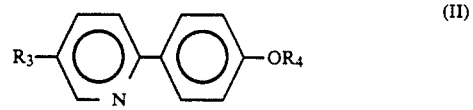

wherein $R_3$ and $R_4$ independently represent an alkyl group of 1 to 18 carbon atoms.

(4) A ferroelectric chiral smectic liquid crystal composition according to the above item (1) wherein said at least one achiral smectic C compound is a racemic compound expressed by the formula

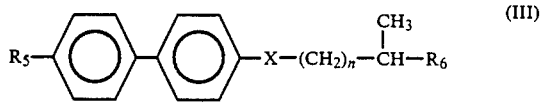

wherein X represents a covalent bond or —O—; n represents an integer of 0 to 10; $R_5$ represents an alkyl group or an alkoxy group each of 1 to 18 carbon atoms; and $R_6$ represents an alkyl group of 2 to 18 carbon atoms.

(5) A ferroelectric chiral smectic liquid crystal composition according to the above item (1) wherein said at least one chiral smectic C compound is a compound expressed by the formula

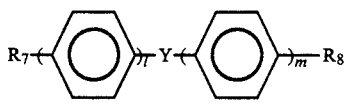

wherein l and m independently represent an integer of 1 or 2; Y represents —COO—, —CH=N—, —CH$_2$O—, —OCO—, —N=CH—, —OCH$_2$— or a single bond; and R$_7$ and R$_8$ each represent an alkyl group, an alkoxy group, an alkoxycarbonyl group, an alkanoyl group or an alkanoyloxy group each of 1 to 18 carbon atoms, and at least one of R$_7$ and R$_8$ contains an asymmetric carbon atom at its alkyl chain part.

(6) A ferroelectric chiral smectic liquid crystal composition according to the above item (2) wherein said at least one chiral smectic C compound is a compound expressed by the formula

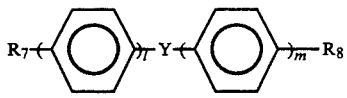

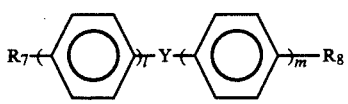

wherein l and m independently represent an integer of 1 or 2; Y represents —COO—, —CH=N—, —CH$_2$O—, —OCO—, —N=CH—, —OCH$_2$— or a single bond; and R$_7$ and R$_8$ each represent an alkyl group, an alkoxy group, an alkoxycarbonyl group, an alkanoyl group or an alkanoyloxy group each of 1 to 18 carbon atoms, and at least one of R$_7$ and R$_8$ contains an asymmetric carbon atom at its alkyl chain part.

(7) A ferroelectric chiral smectic liquid crystal composition according to the above item (3) wherein said at least one chiral smectic C compound is a compound expressed by the formula

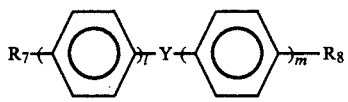

wherein l and m independently represent an integer of 1 or 2; Y represents —COO—, —CH=N—, —CH$_2$O—, —OCO—, —N=CH—, —OCH$_2$— or a single bond; and R$_7$ and R$_8$ each represent an alkyl group, an alkoxy group, an alkoxycarbonyl group, an alkanoyl group or an alkanoyloxy group each of 1 to 18 carbon atoms, and at least one of R$_7$ and R$_8$ contains an asymmetric carbon atom at its alkyl chain part.

(8) A ferroelectric chiral smectic liquid crystal composition according to the above item (4) wherein said at least one chiral smectic C compound is a compound expressed by the formula

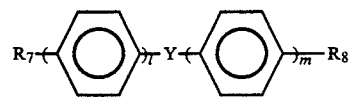

wherein l and m independently represent an integer of 1 or 2; Y represents —COO—, —CH=N—, —CH$_2$O—, —OCO—, —N=CH—, —OCH$_2$— or a single bond; and R$_7$ and R$_8$ each represent an alkyl group, an alkoxy group, an alkoxycarbonyl group, an alkanoyl group or an alkanoyloxy group each of 1 to 18 carbon atoms, and at least one of R$_7$ and R$_8$ contains an asymmetric carbon atom at its alkyl chain part.

(9) A ferroelectric chiral smectic liquid crystal composition according to the above item (1) wherein said at least one chiral smectic C compound comprises at least two compounds of at least one ferroelectric chiral smectic C liquid crystal compound having a helical twist sense right-handed and at least one ferroelectric chiral smectic C liquid crystal compound having a helical twist sense left-handed.

The present invention in a second aspect resides in:

(10) A light switching element using a ferroelectric chiral smectic liquid crystal composition as set forth in the above item (1).

DETAILED DESCRIPTION OF PREFERRED EMBODIMENTS

Figure 1:
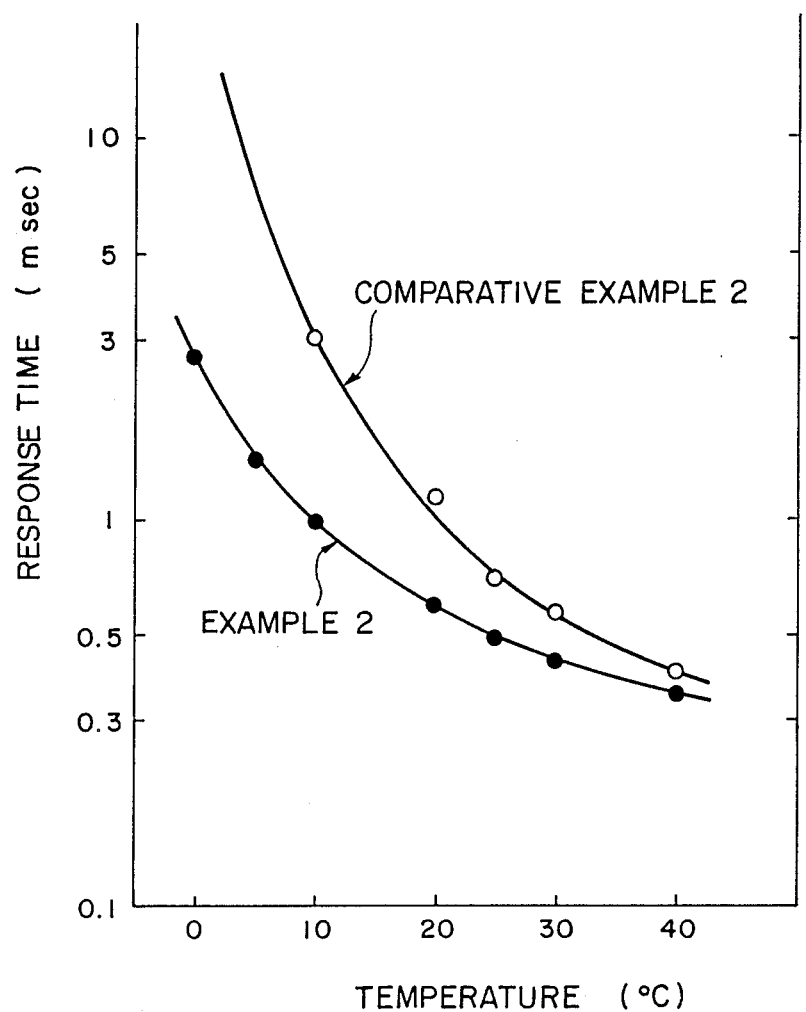
FIG. 1 shows a chart illustrating the respective temperature-dependincies of response properties of a ferroelectric liquid crystal composition shown in Example 2 described later and that shown in Comparative example 2. The ordinate axis refers to the logarithmic scale of response time.

The chiral smectic liquid crystal compound used in the present invention, having a helical structure and expressed by the above formula (IV) will be exemplified below. As the group having an asymmetric carbon atom, expressed by R$_7$ or R$_8$ of the formula (IV), there are a large number of substituents derived from (S)-2-methylbutanol, (S)-1-methylheptanol or (R)-1-methylheptanol. The spontaneous polarization values of compounds having substituents derived from 2-methylbutanol are not so large as 3~5 nC/cm$^2$, but these compounds derived from 1-methylheptanol include a large number of compounds having a spontaneous polarization value as very large as 50~100 nC/cm$^2$.

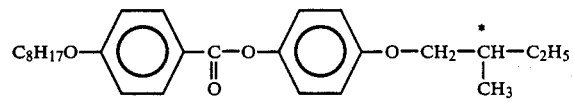

-continued
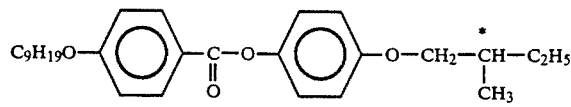
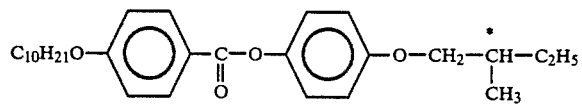
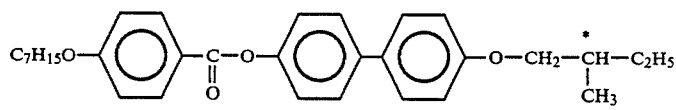
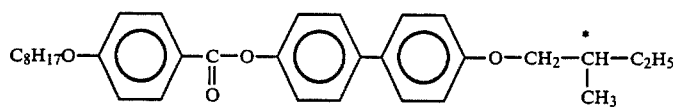
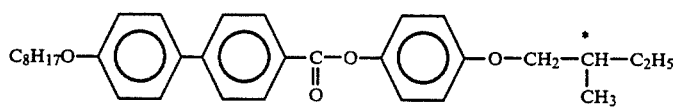
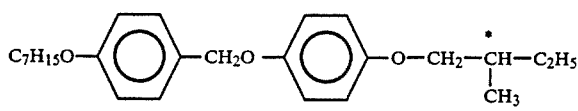
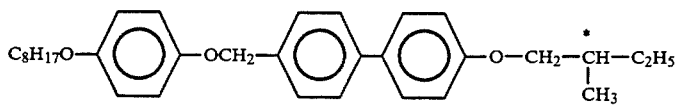
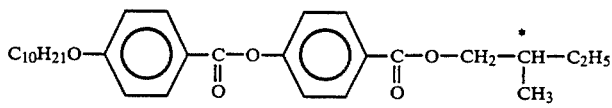
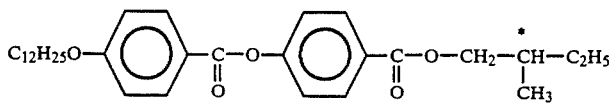
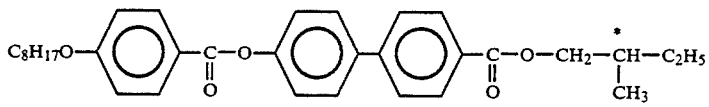
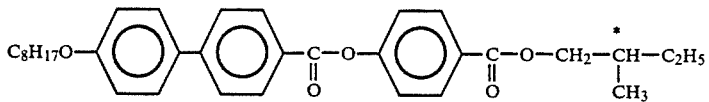
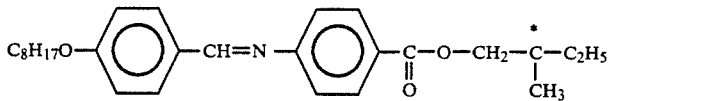

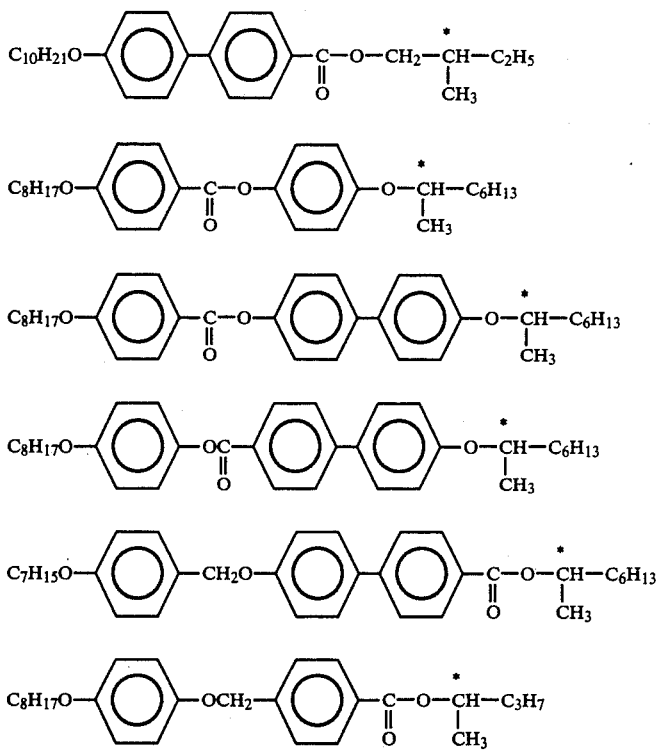

The symbol * in the above structural formulas means that the carbon atom having the symbol attached is an asymmetric carbon atom. The above liquid crystal compounds having a helical structure are naturally optically active.

The achiral smectic C liquid crystal compound containing pyrimidin-2,5-diyl group, used in the present invention, includes, for example, compounds as listed below in Tables 1~3.

TABLE 1

Compounds expressed by the formula

R—⟨phenyl⟩—⟨pyrimidine(N,N)⟩—$R^1$

| R | $R^1$ | R | $R^1$ |
|---|---|---|---|
| C6H13O— | C8H17— | C7H15O— | C9H19— |
| " | C9H19— | " | C10H21— |
| " | C10H21— | " | C11H23— |
| " | C11H23— | C8H17O— | C8H17— |
| C8H17O— | C9H19— | C12H25O— | C7H15— |
| " | C10H21— | " | C8H17— |
| " | C11H23— | C5H11COO— | C8H17— |
| C9H19O— | C7H15— | C6H13COO— | " |
| " | C8H17— | C7H15COO— | " |
| " | C9H19— | C8H17COO— | " |
| " | C10H21— | C9H19COO— | " |
| C10H21O— | C8H17— | C10H21COO— | " |
| C11H23O— | C7H15— | C11H23COO— | " |
| " | C8H17— | | |

TABLE 2

Compounds expressed by the formula

R—⟨phenyl⟩—⟨pyrimidine⟩—⟨phenyl⟩—$R^1$

| R | $R^1$ | R | $R^1$ |
|---|---|---|---|
| C4H9O— | C4H9O— | C9H19O— | C9H19O— |
| C5H11O— | C5H11O— | C10H21O— | C10H21O— |
| C6H13O— | C6H13O— | C11H23O— | C11H23O— |
| C7H15O— | C7H15O— | C12H25O— | C12H25O— |
| C8H17O— | C8H17O— | C14H29O— | C14H29O— |
| C4H9— | C4H9O— | C6H13— | C5H11O— |
| " | C5H11O— | " | C6H13O— |
| " | C6H13O— | " | C7H15O— |
| " | C7H15O— | " | C8H17O— |
| " | C8H17O— | " | C9H19O— |
| " | C9H19O— | " | C10H21O— |
| " | C10H21O— | " | C12H25O— |
| " | C11H23O— | " | C14H29O— |
| " | C12H25O— | C7H15— | C5H11O— |
| " | C14H29O— | " | C6H13O— |
| C5H11— | C5H11O— | " | C7H15O— |
| " | C6H13O— | " | C8H17O— |
| " | C7H15O— | " | C9H19O— |
| " | C8H17O— | " | C10H21O— |
| " | C9H19O— | " | C12H25O— |
| " | C10H21O— | " | C14H29O— |
| C5H11— | C12H25O— | C8H17— | C5H11O— |
| " | C14H29O— | " | C6H13O— |
| C8H17— | C7H15O— | C10H21— | C9H19O— |
| " | C8H17O— | " | C10H21O— |
| " | C9H19O— | " | C12H25O— |
| " | C10H21O— | " | C14H29O— |
| " | C12H25O— | C12H25— | C5H11O— |
| " | C14H29O— | " | C6H13O— |
| C9H19— | C5H11O— | " | C7H15O— |
| " | C6H13O— | " | C8H17O— |
| " | C7H15O— | " | C9H19O— |
| " | C8H17O— | " | C10H21O— |
| " | C9H19O— | " | C12H25O— |

TABLE 2-continued

Compounds expressed by the formula $$R-\phantom{}\underset{N}{\overset{N}{\bigcirc}}\phantom{}-\bigcirc-R^1$$

| R | R¹ | R | R¹ |
|---|---|---|---|
| " | $C_{10}H_{21}O-$ | " | $C_{14}H_{29}O-$ |
| " | $C_{12}H_{25}O-$ | $C_5H_{11}O-$ | $C_5H_{11}-$ |
| " | $C_{14}H_{29}O-$ | " | $C_6H_{13}-$ |
| $C_{10}H_{21}-$ | $C_5H_{11}O-$ | " | $C_7H_{15}-$ |
| " | $C_6H_{13}O-$ | " | $C_8H_{17}-$ |
| " | $C_7H_{15}O-$ | " | $C_9H_{19}-$ |
| " | $C_8H_{17}O-$ | " | $C_{10}H_{21}-$ |
| $C_5H_{11}O-$ | $C_{12}H_{25}-$ | $C_8H_{17}O-$ | $C_5H_{11}-$ |
| " | $C_{14}H_{29}-$ | " | $C_6H_{13}-$ |
| $C_6H_{13}O-$ | $C_5H_{11}-$ | " | $C_7H_{15}-$ |
| " | $C_6H_{13}-$ | " | $C_8H_{17}-$ |
| " | $C_7H_{15}-$ | " | $C_9H_{19}-$ |
| " | $C_8H_{17}-$ | " | $C_{10}H_{21}-$ |
| " | $C_9H_{19}-$ | " | $C_{12}H_{25}-$ |
| " | $C_{10}H_{21}-$ | " | $C_{14}H_{29}-$ |
| " | $C_{12}H_{25}-$ | $C_9H_{19}O-$ | $C_5H_{11}-$ |
| " | $C_{14}H_{29}-$ | " | $C_6H_{13}-$ |
| $C_7H_{15}O-$ | $C_5H_{11}-$ | " | $C_7H_{15}-$ |
| " | $C_6H_{13}-$ | " | $C_8H_{17}-$ |
| " | $C_7H_{15}-$ | " | $C_9H_{19}-$ |
| " | $C_8H_{17}-$ | " | $C_{10}H_{21}-$ |
| " | $C_9H_{19}-$ | " | $C_{12}H_{25}-$ |
| " | $C_{10}H_{21}-$ | " | $C_{14}H_{29}-$ |
| " | $C_{12}H_{25}-$ | $C_{10}H_{21}O-$ | $C_5H_{11}-$ |
| " | $C_{14}H_{29}-$ | " | $C_6H_{13}-$ |
| $C_{10}H_{21}O-$ | $C_7H_{15}-$ | $C_{12}H_{25}O-$ | $C_{10}H_{21}-$ |
| " | $C_8H_{17}-$ | " | $C_{12}H_{25}-$ |
| " | $C_9H_{19}-$ | " | $C_{14}H_{29}-$ |
| " | $C_{10}H_{21}-$ | $C_{14}H_{29}O-$ | $C_5H_{11}-$ |
| " | $C_{12}H_{25}-$ | " | $C_6H_{13}-$ |
| " | $C_{14}H_{29}-$ | " | $C_7H_{15}-$ |
| $C_{12}H_{25}O-$ | $C_5H_{11}-$ | " | $C_8H_{17}-$ |
| " | $C_6H_{13}-$ | " | $C_9H_{19}-$ |
| " | $C_7H_{15}-$ | " | $C_{10}H_{21}-$ |
| " | $C_8H_{17}-$ | " | $C_{12}H_{25}-$ |
| " | $C_9H_{19}-$ | " | $C_{14}H_{29}-$ |

TABLE 3

Compounds expressed by the formula $$R-\phantom{}\underset{N}{\overset{N}{\bigcirc}}\phantom{}-\bigcirc-\bigcirc-R^1$$

| R | R¹ | R | R¹ |
|---|---|---|---|
| $C_4H_9-$ | $C_4H_9O-$ | $C_4H_9-$ | $C_8H_{17}O-$ |
| " | $C_5H_{11}O-$ | " | $C_9H_{19}O-$ |
| " | $C_6H_{13}O-$ | " | $C_{10}H_{21}O-$ |
| " | $C_7H_{15}O-$ | " | $C_{11}H_{23}O-$ |
| $C_4H_9-$ | $C_{12}H_{25}O-$ | $C_7H_{15}-$ | $C_5H_{11}O-$ |
| " | $C_{14}H_{29}O-$ | " | $C_6H_{13}O-$ |
| $C_5H_{11}-$ | $C_5H_{11}O-$ | " | $C_7H_{15}O-$ |
| " | $C_6H_{13}O-$ | " | $C_8H_{17}O-$ |
| " | $C_7H_{15}O-$ | " | $C_9H_{19}O-$ |
| " | $C_8H_{17}O-$ | " | $C_{10}H_{21}O-$ |
| " | $C_9H_{19}O-$ | " | $C_{12}H_{25}O-$ |
| " | $C_{10}H_{21}O-$ | " | $C_{14}H_{29}O-$ |
| " | $C_{12}H_{25}O-$ | $C_8H_{17}-$ | $C_5H_{11}O-$ |
| " | $C_{14}H_{29}O-$ | " | $C_6H_{13}O-$ |
| $C_6H_{13}-$ | $C_5H_{11}O-$ | " | $C_7H_{15}O-$ |
| " | $C_6H_{13}O-$ | " | $C_8H_{17}O-$ |
| " | $C_7H_{15}O-$ | " | $C_9H_{19}O-$ |
| " | $C_8H_{17}O-$ | " | $C_{10}H_{21}O-$ |
| " | $C_9H_{19}O-$ | " | $C_{12}H_{25}O-$ |
| " | $C_{10}H_{21}O-$ | " | $C_{14}H_{29}O-$ |
| " | $C_{12}H_{25}O-$ | $C_9H_{19}-$ | $C_5H_{11}O-$ |
| " | $C_{14}H_{29}O-$ | " | $C_6H_{13}O-$ |
| $C_9H_{19}-$ | $C_7H_{15}O-$ | $C_{12}H_{25}-$ | $C_9H_{19}O-$ |

TABLE 3-continued

Compounds expressed by the formula $$R-\phantom{}\underset{N}{\overset{N}{\bigcirc}}\phantom{}-\bigcirc-\bigcirc-R^1$$

| R | R¹ | R | R¹ |
|---|---|---|---|
| " | $C_8H_{17}O-$ | " | $C_{10}H_{21}O-$ |
| " | $C_9H_{19}O-$ | " | $C_{12}H_{25}O-$ |
| " | $C_{10}H_{21}O-$ | " | $C_{14}H_{29}O-$ |
| " | $C_{12}H_{25}O-$ | $C_5H_{11}-$ | $C_5H_{11}-$ |
| " | $C_{14}H_{29}O-$ | " | $C_6H_{13}-$ |
| $C_{10}H_{21}-$ | $C_5H_{11}O-$ | " | $C_7H_{15}-$ |
| " | $C_6H_{13}O-$ | " | $C_8H_{17}-$ |
| " | $C_7H_{15}O-$ | " | $C_9H_{19}-$ |
| " | $C_8H_{17}O-$ | " | $C_{10}H_{21}-$ |
| " | $C_9H_{19}O-$ | " | $C_{12}H_{25}-$ |
| " | $C_{10}H_{21}O-$ | " | $C_{14}H_{29}-$ |
| " | $C_{12}H_{25}O-$ | $C_6H_{13}-$ | $C_5H_{11}-$ |
| " | $C_{14}H_{29}O-$ | " | $C_6H_{13}-$ |
| $C_{12}H_{25}-$ | $C_5H_{11}O-$ | " | $C_7H_{15}-$ |
| " | $C_6H_{13}O-$ | " | $C_8H_{17}-$ |
| " | $C_7H_{15}O-$ | " | $C_9H_{19}-$ |
| " | $C_8H_{17}O-$ | " | $C_{10}H_{21}-$ |
| $C_6H_{13}-$ | $C_{12}H_{25}-$ | $C_9H_{19}-$ | $C_5H_{11}-$ |
| " | $C_{14}H_{29}-$ | " | $C_6H_{13}-$ |
| $C_7H_{15}-$ | $C_5H_{11}-$ | " | $C_7H_{15}-$ |
| " | $C_6H_{13}-$ | " | $C_8H_{17}-$ |
| " | $C_7H_{15}-$ | " | $C_9H_{19}-$ |
| " | $C_8H_{17}-$ | " | $C_{10}H_{21}-$ |
| " | $C_9H_{19}-$ | " | $C_{12}H_{25}-$ |
| " | $C_{10}H_{21}-$ | " | $C_{14}H_{29}-$ |
| " | $C_{12}H_{25}-$ | $C_{10}H_{21}-$ | $C_5H_{11}-$ |
| " | $C_{14}H_{29}-$ | " | $C_6H_{13}-$ |
| $C_8H_{17}-$ | $C_5H_{11}-$ | " | $C_7H_{15}-$ |
| " | $C_6H_{13}-$ | " | $C_8H_{17}-$ |
| " | $C_7H_{15}-$ | " | $C_9H_{19}-$ |
| " | $C_8H_{17}-$ | " | $C_{10}H_{21}-$ |
| " | $C_9H_{19}-$ | " | $C_{12}H_{25}-$ |
| " | $C_{10}H_{21}-$ | " | $C_{14}H_{29}-$ |
| " | $C_{12}H_{25}-$ | $C_{12}H_{25}-$ | $C_5H_{11}-$ |
| " | $C_{14}H_{25}-$ | " | $C_6H_{13}-$ |
| $C_{12}H_{25}-$ | $C_7H_{15}-$ | $C_{14}H_{29}-$ | $C_5H_{11}-$ |
| " | | " | $C_6H_{13}-$ |
| " | $C_8H_{17}-$ | " | $C_7H_{15}-$ |
| " | $C_9H_{19}-$ | " | $C_8H_{17}-$ |
| " | $C_{10}H_{21}-$ | " | $C_9H_{19}-$ |
| | | " | $C_{10}H_{21}-$ |
| " | $C_{12}H_{25}-$ | " | $C_{12}H_{25}-$ |
| " | $C_{14}H_{29}-$ | " | $C_{14}H_{29}-$ |

Further, examples of achiral smectic C liquid crystal compounds containing pyridin-2,5-diyl group, used in the present invention, are as follows:

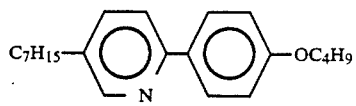

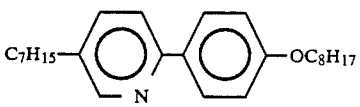

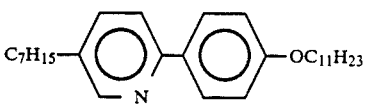

-continued

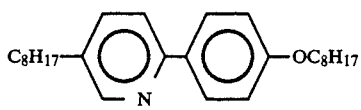
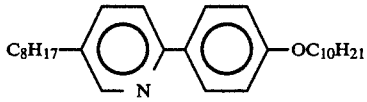
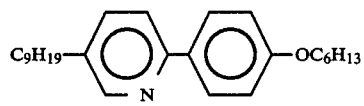
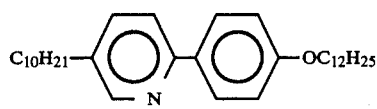

Further, examples of achiral smectic C liquid crystal compounds containing 4,4'-biphenylyl group, used in the present invention are racemic compounds as fol- -continued

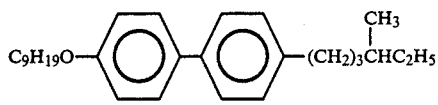
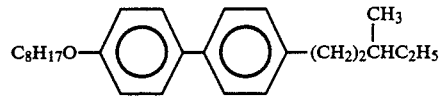
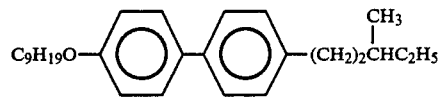
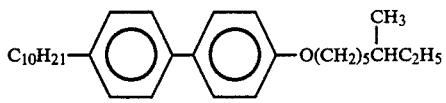

Next, the present invention will be described by way of examples.

A ferroelectric chiral smectic liquid crystal composition (A) consisting of the following compounds:

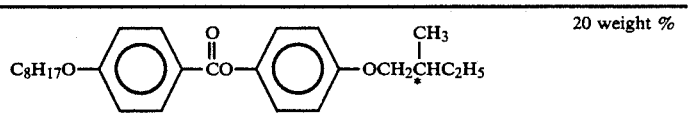 20 weight %

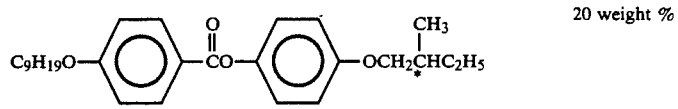 20 weight %

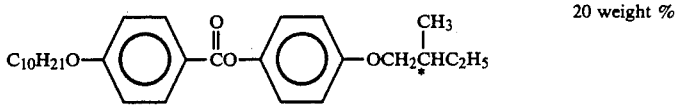 20 weight %

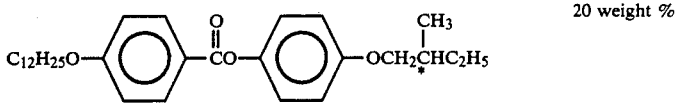 20 weight %

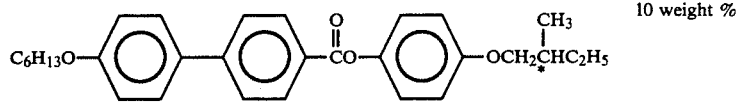 10 weight %

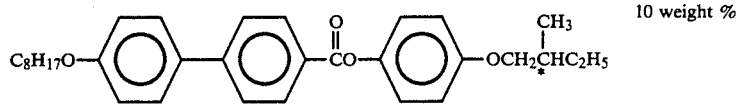 10 weight % lows:

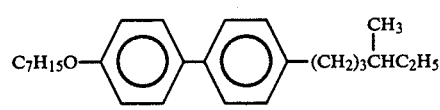
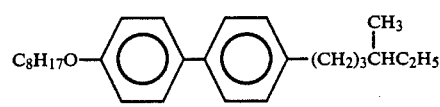

had a transition point (hereinafter referred to as $T_c$) from $S_c^*$ phase to smectic A phase (hereinafter referred to as $S_A$ phase) of 51° C. When the difference (hereinafter referred to as $T_c-T$) between $T_c$ and the temperature (T) of the spontaneous polarization measured was 25° C., Ps was 2.3 nC/cm$^2$ and the tilt angle was 22.0°. This liquid crystal composition (A) was filled in a cell subjected to aligning treatment and having a distance between electrodes of 2.0 μm and a rectangular wave of 10 V was impressed at room temperature to measure its response time. As a result it was 1 msec. The viscosity of (A) was calculated using the formula (2) to obtain 1.2 poise.

Whereas, a ferroelectric chiral smectic liquid crystal composition (B) containing as components, the following three kinds of pyrimidine derivatives having $S_c$ phase:

containing pyrimidin-2,5-diyl group becomes very short when Ps is almost the same.

Further, a ferroelectric chiral smectic liquid crystal composition (C) containing as components, the following five kinds of pyridine derivatives having $S_c$ phase:

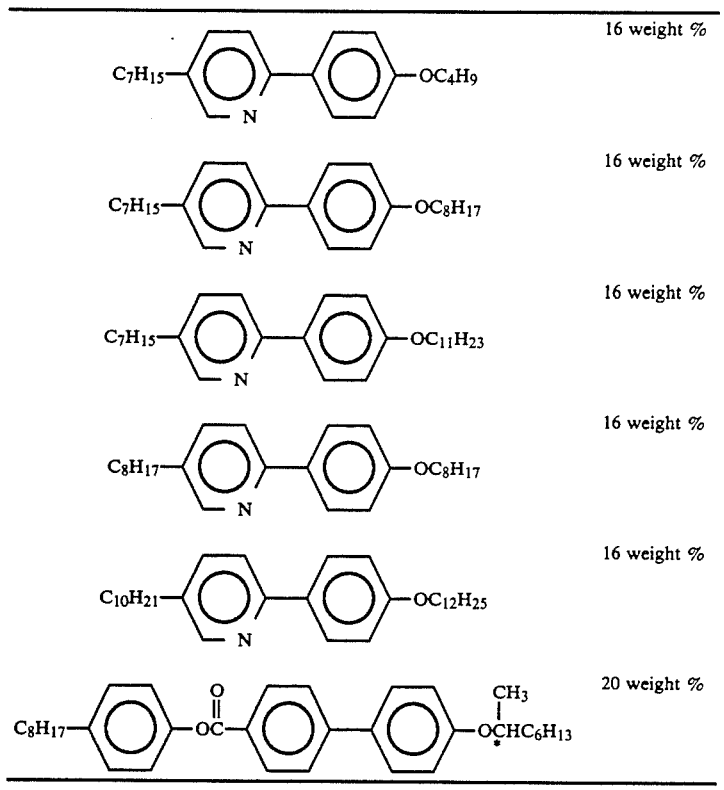

had a transition point of $S_c^*$ phase to $S_A$ phase of 54° C.

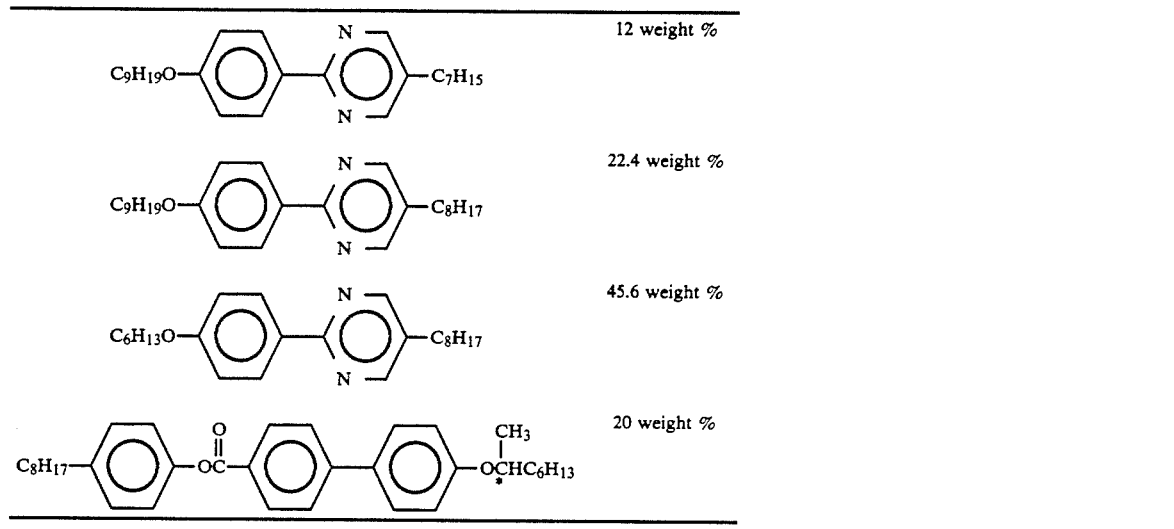

had a transition point $S_c^*$ phase to $S_A$ phase of 44° C. When $(T_c-T)$ was 20° C., Ps was 2.8 nC/cm², and when this liquid crystal composition (B) was filled in the same cell as in the case of (A) to measure its response time, which was 0.5 msec at room temperature. Further the viscosity of the composition (B) was 0.7 poise. As seen from these examples, the response time of ferroelectric chiral smectic liquid crystal compositions The Ps was 8 nC/cm² at 35° C. and the response time was 0.1 msec. Further the viscosity of the composition (C) was 0.4 poise. On the other hand, the above composition (A) had a Ps at 35° C. of 2 nC/cm² and a response time of 0.8 msec. The viscosity of the composition (A) at that time was 0.8 poise. As seen from this example, since the ferroelectric chiral smectic liquid crystal compositions having pyridin-2,5-diyl group have a very low viscosity, the response time becomes very short.

Further, a ferroelectric chiral smectic liquid crystal composition (D) containing as components, the following three recemates of biphenyl drivatives having $S_c$ phase:

kind of ferroelectric chiral smectic liquid crystal compound.

(iv) In general, optically active 2-alkanols are expensive; hence ferroelectric chiral smectic liquid crystal compounds using the alcohols as raw material are also expensive. According to the present invention, it is

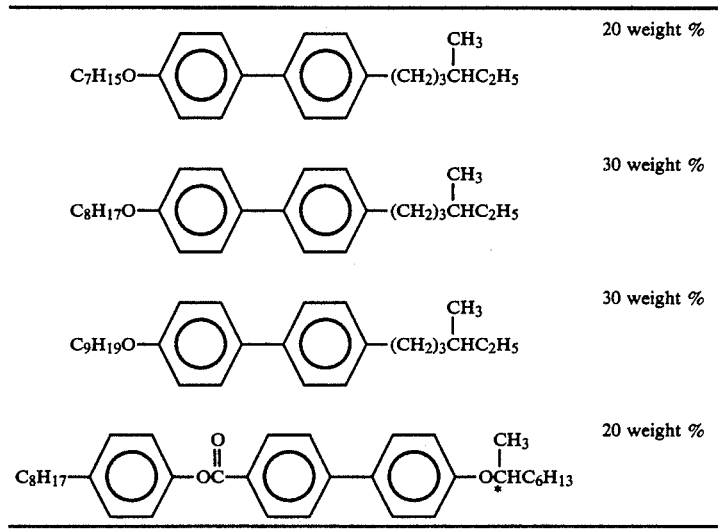

had a transition point from $S_c^*$ phase to $S_A$ phase of 43° C. The Ps was 12 nC/cm² at room temperature and the response time was 0.1 msec. Further the viscosity of the composition (D) at that time was 0.6 poise. As seen from this example, since ferroelectric chiral smectic liquid crystal compositions using compounds having 4,4'-biphenylyl group have a very low viscosity, the response time becomes very short.

As described above, it has been found that liquid crystal compounds of directly linked rings type having $S_c$ phase and having no helical structure have a very low viscosity, and by using these achiral smectic C liquid crystal compounds, it is possible to obtain ferroelectric chiral smectic liquid crystal compositions having superior response properties.

In addition, by blending achiral smectic C liquid crystal compounds expressed by the formulas (I), (II) or/and (III) with ferroelectric chiral smectic liquid crystal compounds or compositions, it is possible to obtain the following advantages:

(i) It is possible to far reduce the viscosity of ferroelectric chiral smectic liquid crystal compositions; thus it is possible to obtain a light switching element having a high response speed.

(ii) It is possible to reduce the temperature-dependency of the response speed.

(iii) The ferroelectric chiral smectic liquid crystal compounds as components have a broad choice range. In other words, since the compounds are not restricted by the helical twist sense; thus in some cases it is possible to obtain a ferroelectric chiral smectic liquid crystal composition having a long helical pitch from only one possible to reduced the quantity of such expensive ferroelectric chiral smectic liquid crystal compounds used, down to a small quantity; hence it is possible to obtain ferroelectric chiral smectic liquid crystal compositions at a relatively cheap cost and thus it is possible to obtain a light switching element of high speed response at a cheap cost.

(v) It is possible to reduce the lower limit temperature of $S_c^*$ phase.

(vi) By adding a liquid crystal compound having $S_c$ phase to a ferroelectric chiral smectic liquid crystal composition consisting of a chiral smectic liquid crystal compound having a right-handed helical twist sense and a chiral smectic liquid crystal compound having a left-handed helical twist sense, it is possible to further prolong the helical pitch of the composition.

In the case of such a composition, it is possible to relatively easily carry out the fine adjustment of the helical pitch.

Beside the effectiveness described in the above items (i)~(vi), the effectiveness of the present invention will be described below in Examples.

The present invention will be described in more detail by way of Examples, but it should not be construed to be limited thereto.

EXAMPLE 1

A chiral smectic liquid crystal composition shown in Table 4A was prepared using the following four kinds of compounds having pyrimidin-2,5-diyl group as compounds having no helical structure:

TABLE 4A

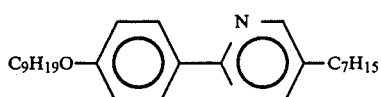

9.6 weight %

TABLE 4A-continued

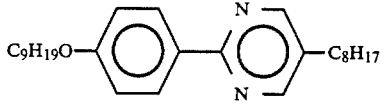 16.8 weight %

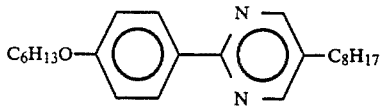 37.6 weight %

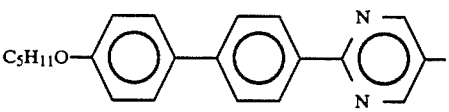 16.0 weight %

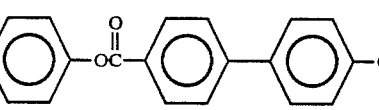 20.0 weight %

The $S_c{}^*$ phase temperature range, spontaneous polarization value, tilt angle and viscosity of this composition are shown in Table 4B. Further the response time is also shown in Table 4B, which time was obtained when the composition was filled in a cell subjected to an aligning treatment and having a distance between electrodes of 2.0 μm, and a rectangular wave alternative current voltage of 10 V (50 Hz) was impressed to the resulting cell at room temperature.

TABLE 4B

| | Example 1 | Compar. ex. 1 |
|---|---|---|
| $S_c{}^*$ Phase temperature range | −2 ~ 52.0° C. | 30 ~ 55.2° C. |
| Ps ($T_c$ − T = 20° C.) | 1.9 nC/cm² | 6.6 nC/cm² |
| Tilt angle ($T_c$ − T = 20°C.) | 19.5° | 15.0° |
| Response time | 0.3 msec | 0.3 msec |

TABLE 4B-continued

| | Example 1 | Compar. ex. 1 |
|---|---|---|
| Viscosity | 0.3 poise | 1.0 poise |

COMPARATIVE EXAMPLE 1

A chiral smectic liquid crystal composition shown in Table 4C was prepared using five kinds of compounds having an ester bond, described below, in place of four compounds having pyrimidin-2,5-diyl group used in Example 1, as compounds having no helical structure. The characteristics of this composition and those of the liquid crystal display element using the composition were measured in the same manner as in Example 1. The results are shown in Table 4B together with those of Example 1.

TABLE 4C

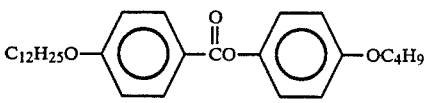 20 weight %

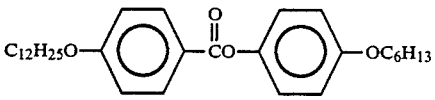 20 weight %

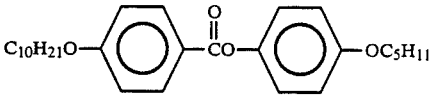 15 weight %

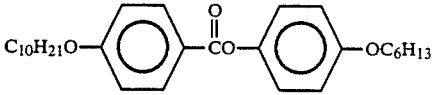 15 weight %

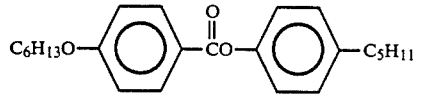 10 weight %

TABLE 4C-continued

C₈H₁₇–⌬–O–C(=O)–⌬–⌬–OCH*(CH₃)C₆H₁₃     20 weight %

In the case of Comparative example 1, transition from a smectic phase to $S_c^*$ phase is observed at 30° C., whereas in the case of Example 1, transition from crystalline phase to $S_c^*$ phase is observed at $-2°$ C. Namely, by using compounds having pyrimidin-2,5-diyl group, it is possible to reduce the lower limit temperature of $S_c^*$ phase.

Next, as to comparison of Ps values, in spite of the fact that Ps value in Example 1 using compounds having pyrimidin-2,5-diyl group is about ⅓ of Ps value in Comparative example 1, the response times in both the cases are the same. From this fact it can been seen that the viscosity in Example 1 is about ⅓ of the viscosity in Comparative example 1.

As described above, it can be seen that the composition of Example 1 has better characteristics than those of Comparative example 1.

EXAMPLE 2 AND COMPARATIVE EXAMPLE 2

A chiral smectic liquid crystal composition consisting four kinds of pyrimidine derivatives and having $S_c$ phase shown in Table 5A (Example 2) was prepared, and also a chiral smectic liquid crystal composition shown in Table 5C (Comparative example 2) was prepared.

The physical properties of these compositions and the characteristics of liquid crystal cells prepared using these compositions in the same manner as in Example 1 were measured. The results are shown in Table 5B.

TABLE 5A

C₉H₁₉O–⌬–[pyrimidine]–C₇H₁₅     7.2 weight %

C₉H₁₉O–⌬–[pyrimidine]–C₈H₁₇     12.6 weight %

C₆H₁₃O–⌬–[pyrimidine]–C₈H₁₇     28.2 weight %

C₅H₁₁–⌬–⌬–[pyrimidine]–C₇H₁₅     12.0 weight %

C₈H₁₇–⌬–C(=O)O–⌬–⌬–OCH₂CH*(CH₃)C₂H₅     10 weight %

C₈H₁₇–⌬–OCH₂–⌬–⌬–CH₂CH*(CH₃)C₂H₅     10 weight %

C₈H₁₇–⌬–O–C(=O)–⌬–⌬–OCH*(CH₃)C₆H₁₃     20 weight %

TABLE 5B

|  | Example 2 | Compar. ex. 2 |
|---|---|---|
| $S_c^* \to S_A$ phase transition point | 62° C. | 63° C. |
| Ps (25° C.) | 3 nC/cm² | 16 nC/cm² |
| Tilt angle (25° C.) | 26° | 26° |
| Response time (25° C.) | 0.5 msec | 0.7 msec |
| Viscosity | 0.8 poise | 5.6 poise |

TABLE 5C

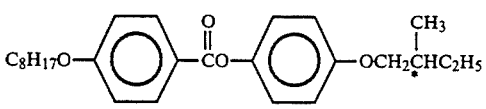 20 weight %

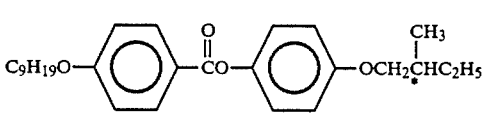 15 weight %

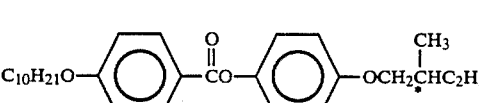 15 weight %

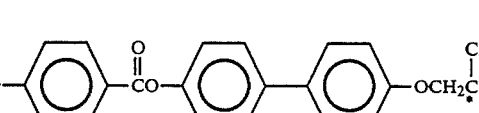 10 weight %

 10 weight %

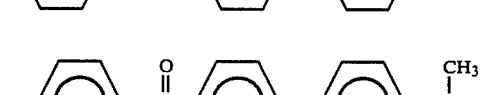 20 weight %

 10 weight %

In comparison of Example 2 with Comparative example 2, in spite of the fact that the spontaneous polarization value of Comparative example 2 is 5 times or more that of Example 2, the response time of Example 2 is shorter than that of Comparative example 2. This is because of the difference in viscosity between the two. Further, in FIG. 1 wherein the temperature-dependencies of the response time in Example 2 and Comparative example 2 are shown, the temperature dependency in Example 2 is far less than that in Comparative example 2, and in comparison at 0° C., the response time in Example 2 is 1/10 or less of that in Comparative example 2. Namely, compositions using compounds having pyrimidine ring are notably improved also in the temperature characteristics.

EXAMPLE 3 AND COMPARATIVE EXAMPLE 3

A composition shown in Table 6A (Example 3) and that shown in Table 6C (Comparative example 3) were prepared, and their physical properties and the characteristics of liquid crystal cells using the compositions were measured. The results are shown in Table 6B.

TABLE 6A

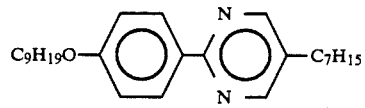 8% by weight

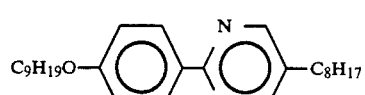 14% by weight

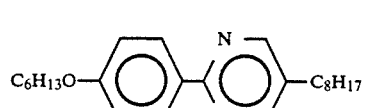 28% by weight

TABLE 6A-continued

| Structure | Weight % |
|---|---|
| $C_8H_{17}O$—⌬—⌬—CO—O—⌬—OCH$_2$*CHC$_2$H$_5$ (CH$_3$) | 10% by weight |
| $C_8H_{17}O$—⌬—CO—O—⌬—⌬—O*CHC$_6$H$_{13}$ (CH$_3$) | 20% by weight |
| $C_5H_{11}$—H—O—CO—⌬—⌬—CH$_2$*CHC$_2$H$_5$ (CH$_3$) | 10% by weight |
| $C_5H_{11}$—H—⌬—CO—O—⌬(NC, CN)—OC$_5$H$_{11}$ | 10% by weight |

TABLE 6B

| | Example 3 | Compar. ex. 3 |
|---|---|---|
| $S_c^* \rightarrow$ Ch phase transition point | 56.6° C. | 66° C. |
| Ps (25° C.) | 4.7 nC/cm$^2$ | 12 nC/cm$^2$ |
| Response time (25° C.) | 1.2 msec | 4 msec |
| Viscosity (25° C.) | 2.8 poise | 24 poise |

As to the response time shown in Table 6B, an anthraquinone dichroic dyestuff (D-16, tradename of product manufactured by BDH Company) was added in one part by weight to 100 parts by weight of the respective compositions shown in Tables 6A and 6C, and with the resulting compositions, the respective response times were measured. As a result, it can be seen that even in the case of guest-host type having a dichroic dyestuff

TABLE 6C

| Structure | Weight % |
|---|---|
| $C_6H_{13}OCO$—⌬—⌬—OCH$_2$*CHC$_2$H$_5$ (CH$_3$) | 10% by weight |
| $C_8H_{17}OCO$—⌬—⌬—OCH$_2$*CHC$_2$H$_5$ (CH$_3$) | 20% by weight |
| $C_9H_{19}OCO$—⌬—⌬—OCH$_2$*CHC$_2$H$_5$ (CH$_3$) | 20% by weight |
| $C_8H_{17}O$—⌬—OCH$_2$—⌬—⌬—CH$_2$*CHC$_2$H$_5$ (CH$_3$) | 10% by weight |
| $C_{10}H_{21}O$—⌬—OCH$_2$—⌬—⌬—CH$_2$*CHC$_2$H$_5$ (CH$_3$) | 10% by weight |
| $C_8H_{17}O$—⌬—O—C—⌬—⌬—O*CHC$_6$H$_{13}$ (CH$_3$) | 20% by weight |
| $C_5H_{11}$—H—⌬—CO—O—⌬(NC, CN)—OC$_5$H$_{11}$ | 10% by weight | added, the viscosity is also notably improved, resulting in a very high response speed.

EXAMPLE 4

The characteristics of a ferroelectric chiral smectic liquid crystal composition consisting of components shown in Table 7A are shown in Table 7B. To 90 parts by weight of this composition were added 10 parts by weight of a compound of the formula (I) wherein $l=0$, $m=0$, $n=1$, $R_2=C_9H_{19}O-$ and $R_1=C_7H_{15}-$.

The characteristics of the resulting composition and a liquid crystal cell using the same are shown in Table 8.

TABLE 7A $C_8H_{17}O-\phi-CO-O-\phi-OCH_2\overset{*}{C}H(CH_3)C_2H_5$     20 parts by weight $C_9H_{19}O-\phi-CO-O-\phi-OCH_2\overset{*}{C}H(CH_3)C_2H_5$     15 parts by weight $C_{10}H_{21}O-\phi-CO-O-\phi-OCH_2\overset{*}{C}H(CH_3)C_5H_5$     15 parts by weight $C_8H_{17}O-\phi-OCH_2-\phi-\phi-CH_2\overset{*}{C}H(CH_3)C_2H_5$     10 parts by weight $C_8H_{17}O-\phi-OC(O)-\phi-\phi-O\overset{*}{C}H(CH_3)C_6H_{13}$     20 parts by weight

TABLE 7B

| | |
|---|---|
| $S_c^* \to S_A$ phase transition point | 53° C. |
| Ps (25° C.) | 19 nC/cm² |
| Response time (25° C.) | 0.75 msec |
| Viscosity (25° C.) | 7.1 poise |

TABLE 8

| | |
|---|---|
| $S_c^* \to S_A$ phase transition point | 56° C. |
| Ps (25° C.) | 14 nC/cm² |
| Response time (25° C.) | 0.6 msec |
| Viscosity (25° C.) | 4.2 poise |

By adding the compound containing a pyrimidine ring in only 10 parts by weight, the viscosity lowered in a quantity as large as about 3 poises, and also the response time was improved by 20%. This indicates that compounds having pyrimidin-2,5-diyl group have a notable effectiveness of lowering the viscosity and also reducing the response time.

EXAMPLE 5

To 90 parts by weight of the following mixture of pyrimidine derivatives:

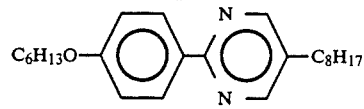

15 parts by weight 28 parts by weight 57 parts by weight

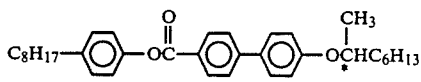

were added 10 parts by weight of a ferroelectric chiral smectic liquid crystal compound expressed by the formula $$C_8H_{17}-\phi-OC(O)-\phi-\phi-O\overset{*}{C}H(CH_3)C_6H_{13}$$

The resulting ferroelectric chiral smectic liquid crystal composition had a $S_c^* \to S_A$ phase transition point of 45° C. and a spontaneous polarization value Ps at room temperature (25° C.) of 1.7 nC/cm².

A liquid crystal display element was prepared using the above composition in the same manner as in Example 1. The display element exhibited a response time (at 25° C.) of 0.5 msec. This indicates that as compared with so far known ferroelectric chiral smectic liquid crystal compositions (such as those of Comparative examples 1, 2, etc.), the response rate has been notably improved in spite of the Ps being very small. As described above, by adding an expensive ferroelectric chiral smectic liquid crystal compound in only a small quantity, it is possible to obtain a superior ferroelectric chiral smectic liquid crystal composition; this is commercially very important.

EXAMPLE 6

Using five kinds of pyridine derivatives as achiral smectic C liquid crystal compounds, a chiral smectic liquid crystal composition consisting of the following compounds was prepared:

was measured to give 0.13 msec. The viscosity at that time was 0.5 poise.

Thus, as apparent from comparison with Comparative example 1, achiral smectic C liquid crystal compounds having pyridin-2,5-diyl group have a low viscosity; hence ferroelectric chiral smectic liquid crystal compositions having very high speed response properties are obtained.

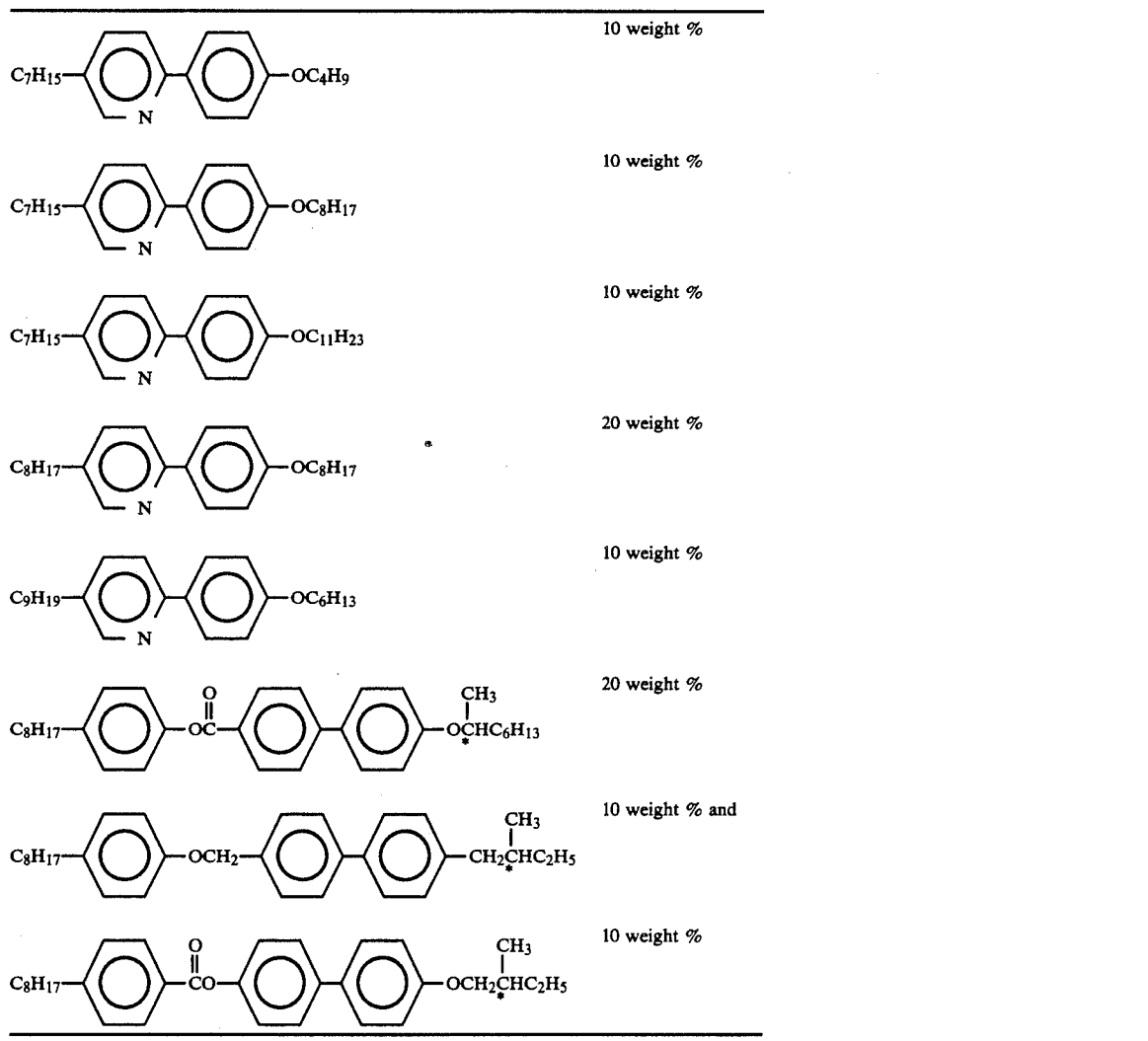

This composition had a temperature region of $S_c^*$ phase of from 30° C. to 65° C., and the Ps at 30° C. was 8 nC/cm². Further, this composition was filled in the same cell as used in Example 1 and the response time

EXAMPLE 7

Using three kinds of racemic compounds having 4,4'-biphenylyl group as achiral smectic C liquid crystal compounds, a chiral smectic liquid crystal composition consisting of the following compounds was prepared:

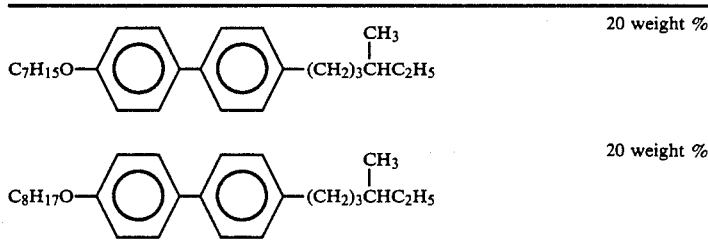

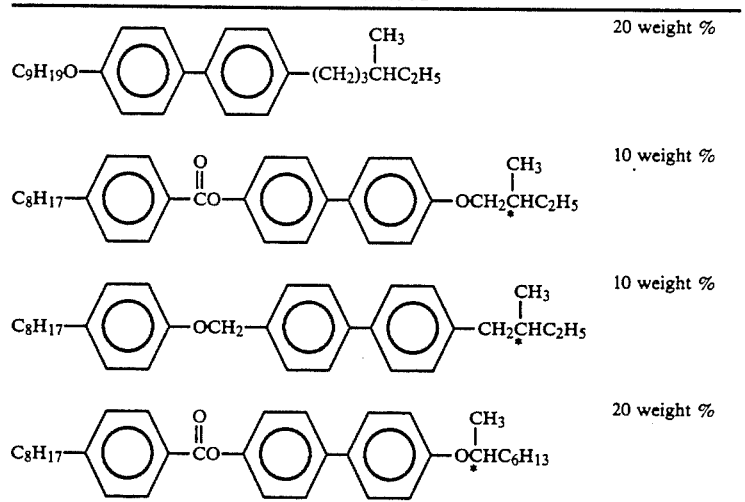

| | |
|---|---|
| C$_9$H$_{19}$O—⟨⟩—⟨⟩—(CH$_2$)$_3$CHC$_2$H$_5$ with CH$_3$ branch | 20 weight % |
| C$_8$H$_{17}$—⟨⟩—CO—O—⟨⟩—⟨⟩—OCH$_2$*CHC$_2$H$_5$ with CH$_3$ | 10 weight % |
| C$_8$H$_{17}$—⟨⟩—OCH$_2$—⟨⟩—⟨⟩—CH$_2$*CHC$_2$H$_5$ with CH$_3$ | 10 weight % |
| C$_8$H$_{17}$—⟨⟩—CO—O—⟨⟩—⟨⟩—O*CHC$_6$H$_{13}$ with CH$_3$ | 20 weight % |

This composition had a temperature range of S$_c$* phase of 20° C. to 50° C. and a Ps at 25° C. of 9 nC/cm$^2$. Further, a liquid crystal display element prepared using the composition in the same manner as in Example 1 had a response time of 0.25 msec. The viscosity was 1.1 poise. As apparent from comparison with Comparative example 2, achiral smectic C liquid crystal compounds having 4,4′-biphenylyl group have a low viscosity; hence a ferroelectric chiral smectic liquid crystal compound having a very high speed response rate is obtained.

What we claimed is:

1. In a ferroelectric chiral smectic liquid crystal composition consisting essentially of at least one achiral smectic C compound and at least one chiral smectic C compound, an improvement which comprises:
   (i) that said at least one achiral smectic C compound is selected from the group consisting of a compound expressed by the formula

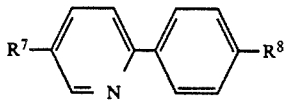

wherein R$^7$ represents an alkyl group of 7 to 10 carbon atoms and R$^8$ represents an alkyloxy group of 4 to 12 carbon atoms, and having a smectic C phase; and a compound expressed by the formula

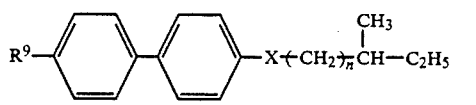

wherein R$^9$ represents an alkyloxy group of 7 to 10 carbon atoms, X represents —O—, or a single bond; n represents an integer of 1 to 5 and having a smectic C phase;
   (ii) that said at least one chiral smectic C component is a compound having a chiral smectic C phase and represented by the formula

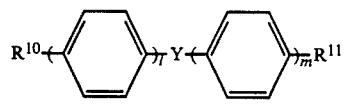

wherein l and m each are an integer of 1 or 2; Y is —COO—, —CH=N—, —CH$_2$O—, —OCO—, —N=CH—, —OCH$_2$—, or a single bond; R$^{10}$ is an alkyl or alkyloxy group of 1 to 18 carbon atoms; and R$^{11}$ is (S)-2-methylbutyl, (S)-2-methylbutoxy, (S)-2-methylbutoxycarbonyl, (S)-1-methylheptyloxy, (R)-1-methylheptyloxy, (S)-1-methylheptyloxycarbonyl, or (R)-1-methylheptyloxycarbonyl.

2. A ferroelectric chiral smectic liquid crystal composition according to claim 1 wherein said at least one achiral smectic C compound is a pyridine compound as defined in claim 1.

3. A ferroelectric chiral smectic liquid crystal composition according to claim 1 wherein said at least one achiral smectic C compound is a biphenyl compound as defined in claim 1.

4. A light switching element containing a composition comprising a ferroelectric chiral smectic liquid crystal composition as set forth in claim 1.

5. A light switching element containing a composition comprising a ferroelectric chiral smectic liquid crystal composition as set forth in claim 2.

6. A light switching element containing a composition comprising a ferroelectric chiral smectic liquid crystal composition as set forth in claim 3.

* * * * *